(12) United States Patent
Miles

(10) Patent No.: US 11,220,308 B1
(45) Date of Patent: Jan. 11, 2022

(54) STEM FOR BICYCLE

(71) Applicant: TIEN HSIN INDUSTRIES CO., LTD., Taichung (TW)

(72) Inventor: Jason Miles, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 0 days.

(21) Appl. No.: 16/985,255

(22) Filed: Aug. 5, 2020

(51) Int. Cl.
*B62K 21/18* (2006.01)
*B62K 21/12* (2006.01)

(52) U.S. Cl.
CPC .............. *B62K 21/18* (2013.01); *B62K 21/12* (2013.01)

(58) Field of Classification Search
CPC combination set(s) only.
See application file for complete search history.

(56) References Cited

U.S. PATENT DOCUMENTS 5,779,253 A * 7/1998 Lee .................... B62K 21/18
280/279
6,343,891 B1 * 2/2002 Combs ................. B62K 21/12
403/385
9,862,450 B2 * 1/2018 Meggiolan ............ B62K 21/12

FOREIGN PATENT DOCUMENTS

GB          479213 A * 2/1938 ............. B62K 21/12

* cited by examiner

Primary Examiner — Vicky A Johnson
(74) Attorney, Agent, or Firm — WPAT, PC

(57) ABSTRACT

A stem for a bicycle includes first and second components. The first component includes first upper and lower fixed seats, which are connected by a first connecting part. The second component includes second upper and lower fixed seats, which are connected by a second connecting part, and the second connecting part intersects with the first connecting part. Two first screws pass through the first upper fixed seat and the second lower fixed seat and screw with two screw holes on one side of the mounting base of the bicycle front fork. Two second screws pass through the second upper fixed seat and the first lower fixed seat and screw with two screw holes on another side of the mounting base of the bicycle front fork. Thus, the bicycle handle bar achieves good controllability and stability, and the stem has advantages of a simple structure, light weight and quickly assembly.

11 Claims, 8 Drawing Sheets

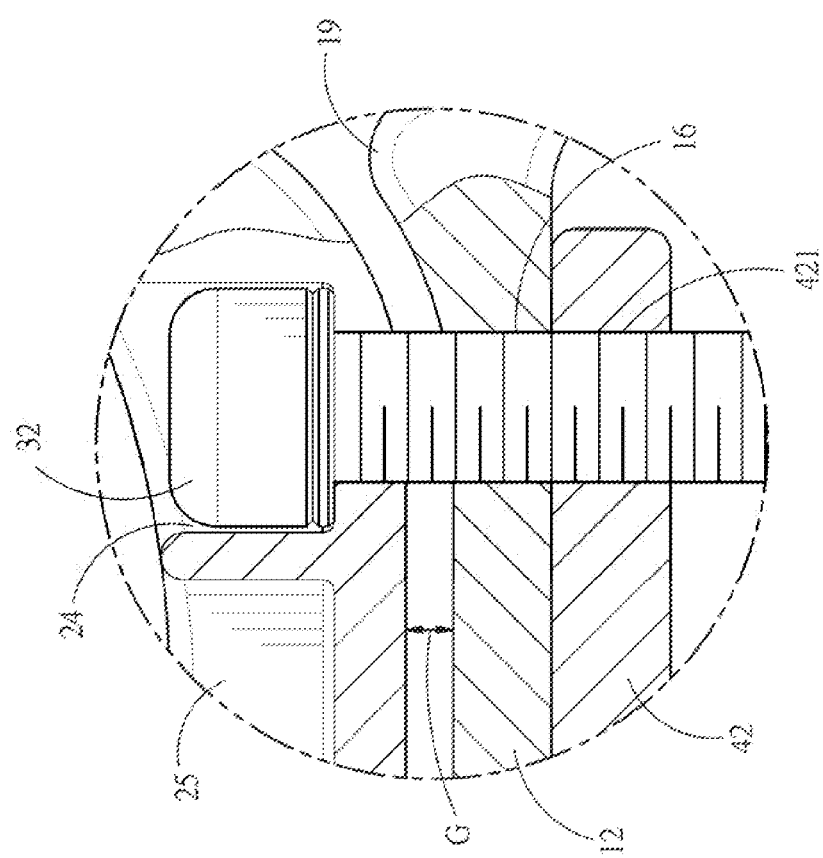

STEM FOR BICYCLE

BACKGROUND

Technical Field

The present disclosure relates to a stem of a bicycle, and in particular, to a direct-mount stem with simple structure light weight and quick assembly.

Related Art

Generally, a stem component of a bicycle is a component configured to connect a bicycle handle bar to a mounting base of a bicycle front fork and has a function of driving a bicycle body to advance in a swinging direction of the bicycle handle bar when a rider controls the swinging of the bicycle handle bar.

Referring to FIG. 1, a conventional direct-mount stem of a bicycle is used to be fixed on a grip rod and fixedly connected to a shoulder cover (not shown) of a direct-mount stem, and the direct-mount stem can define a central axis, including a base 1, two first screws 2, two second screws 3, an upper cover 4 and four third screws 5. The base 1 includes a clamping part 1a, two extension parts 1b extending from the clamping part 1a, and two first through holes 1c respectively disposed on the two extension parts 1b. The clamping part 1a includes a top surface 1d, a lower recess 1e depressed from the top surface 1d, a lower concave cambered surface 1f in the lower recess 1e, two second through holes 1g disposed on the lower concave cambered surface 1f, and four screw holes 1c disposed on the top surface 1d. The first screws 2 respectively run through the two first through holes 1c, and are used to screw and fasten to the shoulder cover; the second screws 3 respectively run through the two second through holes 1g, and are used to screw and fasten to the shoulder cover; the upper cover 4 includes a bottom surface 4a, an upper recess 4b depressed from the bottom surface 4a, an upper concave cambered surface 4c in the upper recess 4b, and four third via holes 4d disposed on the bottom surface 4a, the bottom surface 4a and the upper concave cambered surface 4c of the upper cover 4 face the top surface 1d and the lower concave cambered surface 1f of the base 1 respectively; and, the four third screws 5 respectively run through the four third via holes 4d and respectively screw with the four screw holes 1h to clamp and fix the grip rod between the lower concave cambered surface 1f and the upper concave cambered surface 4c. In this way, the bicycle has good controllability and stability.

However, in manufacturing assembly, in order to mount and fasten the base 1 to the shoulder cover, the two first screws 2 and the two second screws 3 need to pass through the two first through holes 1c and the two second through holes 1g of the base 1 and then screw with the shoulder cover; to clamp the bicycle grip rod by the base 1 and the upper cover 4, the four third screws 5 need to be used to pass through the third via holes 4d of the upper cover 4 and then screw with the four screw holes 1h of the base 1, and this not only takes time and effort but also increases the weight of the entire bicycle.

SUMMARY

Therefore, a main objective of the present disclosure is to provide a stem with sample structure, light weight and quick assembly, to make a bicycle highly controllable and stable.

To achieve the above objectives, the present disclosure provides a stem for a bicycle, configured to mount a handle bar of the bicycle to a mounting base of a bicycle front fork, comprising: a first component, a second component, a first screw and a second screw. The first component comprises a first upper fixed seat and a first lower fixed seat, the first upper fixed seat and the first lower fixed seat are connected by a first connecting part, at least one first via hole is formed on the first upper fixed seat, at least one first through hole is formed on the first lower fixed seat, and the first upper fixed seat and the first lower fixed seat are horizontally offset by a first spacing; the second component comprises a second upper fixed seat and a second lower fixed seat, the second upper fixed seat and the second lower fixed seat are connected by a second connecting part, at least one second via hole is formed on the second upper fixed seat, at least one second through hole is formed on the second lower fixed seat, and the second upper fixed seat and the second lower fixed seat are horizontally offset by a second spacing; the first screw passes through the first via hole of the first upper fixed seat and the second through hole of the second lower fixed seat and screws with a screw hole on one side of the mounting base of the bicycle front fork; and the second screw passes through the second via hole of the second upper fixed seat and the first through hole of the first lower fixed seat and screws with a screw hole on another side of the mounting base of the bicycle front fork.

The first connecting part is disposed along an outer surface of the handle bar of the bicycle, the second connecting part is disposed along the outer surface of the handle bar of the bicycle and intersects with the first connecting part, and the first connecting part of the first component is provided with a recess, and the second connecting part of the second component passes through the recess.

The stem for a bicycle further comprises a first gasket and a second gasket, the first gasket is disposed between the mounting base of the bicycle front fork and the second lower fixed seat, and the second gasket is disposed between the mounting base of the bicycle front fork and the first lower fixed seat.

A first protruding part protruding towards the first upper fixed seat is disposed between the first connecting part and the first lower fixed seat, and a second protruding part protruding towards the second upper fixed seat is disposed between the second connecting part and the second lower fixed seat.

Two first via holes are formed on the first upper fixed seat, two first through holes are formed on the first lower fixed seat, two second through holes are formed on the second upper fixed seat, and two second through holes are formed on the second lower fixed seat.

A first cavity is formed between the two first via holes of the first upper fixed seat, and a second cavity is formed between the two second via holes of the second upper fixed seat.

The first spacing is in a range of 25 mm to 45 mm; the second spacing is in a range of 25 mm to 45 mm, and the first spacing is equal to the second spacing.

The first spacing is 35 mm; the second spacing is 35 mm, and the first spacing is equal to the second spacing.

When the stem is mounted to the handle bar of the bicycle, a horizontal distance between a central axis of the first screw and a central axis of the adjacent second screw is 50 mm.

A first flange towards the second upper fixed seat is disposed on the first lower fixed seat, one of the two first through holes is located in the first flange; and, a second flange towards the first upper fixed seat is disposed on the second lower fixed seat, and one of the two second through holes is located in the second flange.

The first flange and the second flange are disposed on the first through hole and the second through hole far away from an end of the handle bar of the bicycle to form a gap between the first upper fixed seat and the second lower fixed seat and a gap between the second upper fixed seat and the first lower fixed seat.

Therefore, the present disclosure has at least the following advantages:

1. In the present disclosure, the first component and the second component include the first connecting part and the second connecting part in a form of a ring belt, the first connecting part and the second connecting part intersect with each other and are disposed along the outer surface of the handle bar of the bicycle, and a horizontal displacement spacing between two adjacent side surfaces of the first upper fixed seat and the first lower fixed seat is 35 mm, a horizontal displacement spacing between two adjacent side surfaces of the second upper fixed seat and the second lower fixed seat is 35 mm, so that the handle bar of the bicycle is clamped by the first connecting part and the second connecting part by a moderate width and has good controllability and stability.

2. In the present disclosure, the first component and the second component are in a form of a ring belt and bound the handle bar of the bicycle, and the two first screws and the two second screws are used to screw and fasten to the mounting base of the bicycle front fork, so that the structure is simple, and the weight is light, and manufacturing costs can be greatly reduced.

3. In the present disclosure, the two first screws pass through the two first via holes of the first upper fixed seat, the two second through holes of the second lower fixed seat and the two first penetration holes of the first gasket respectively, the first screw then screws with the screw hole on one side of the mounting base, the two second screws pass through the two second via holes of the second upper fixed seat, the two first through holes of the first lower fixed seat and the two second penetration holes of the second gasket respectively, and the second screw then screws with the screw hole on the other side of the mounting base, whereby fixing the handle bar of the bicycle can be fixed on the mounting base of the bicycle front fork. Therefore, as compared with a conventional direct-mount stem structure, the present disclosure can save four screws, and the first component and the second component in a form of a ring belt according to the present disclosure have simple structure and light weight, so that not only the manufacturing costs can be reduced, but also the assembly is simple and quick, and the weight of the entire bicycle can be reduced.

BRIEF DESCRIPTION OF THE DRAWINGS

FIG. 6B is a part of an enlarged view of a stem according to an embodiment of the present disclosure.

DETAILED DESCRIPTION

Figure 1:
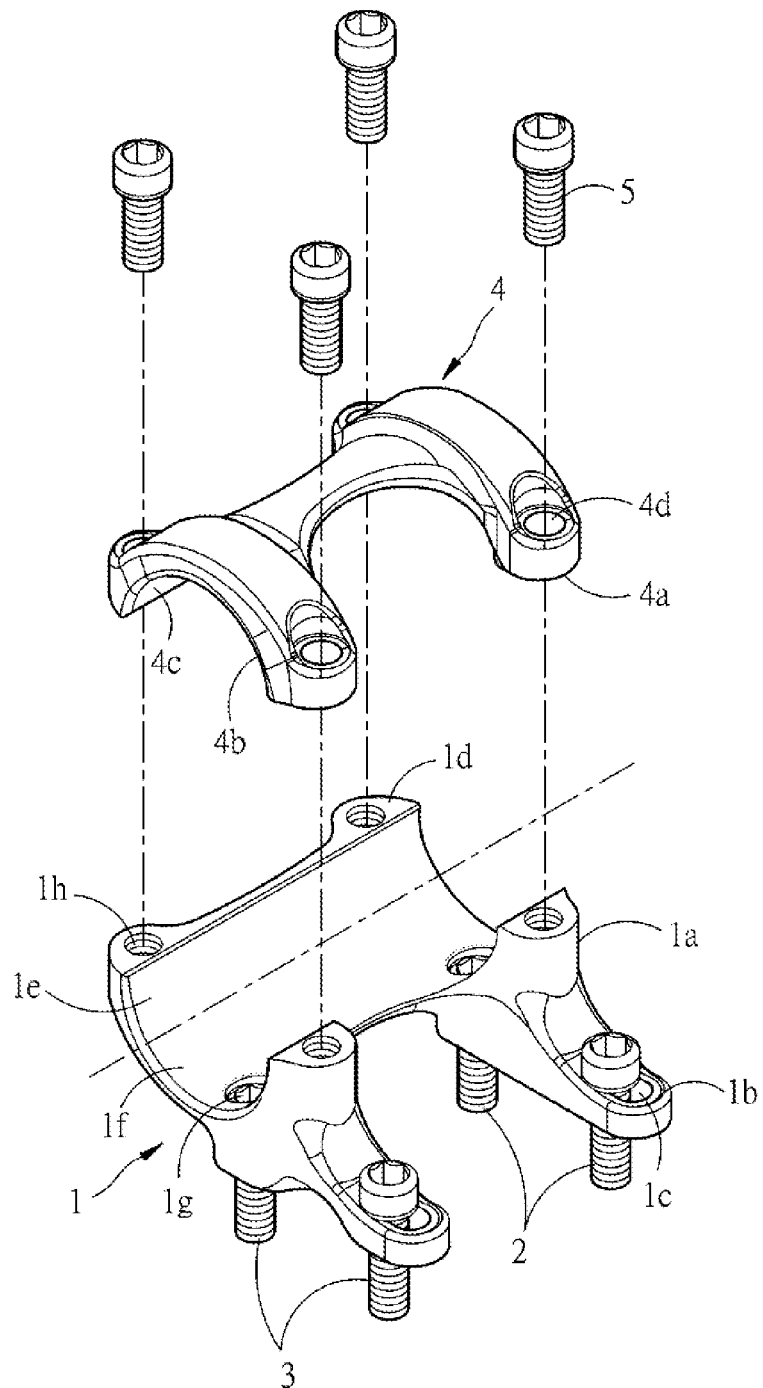
FIG. 1 is a schematic diagram of a conventional direct-mount stem.

In order to make persons skilled in the art better understand the solutions of the present disclosure, the following clearly and completely describes the technical solutions in the embodiments of the present disclosure with reference to the accompanying drawings in the embodiments of the present disclosure. Apparently, the described embodiments are only some of the embodiments of the present disclosure rather than all of the embodiments. Based on the embodiments of the present disclosure, all other embodiments obtained under the premise of equivalent change or modification made by persons skilled in the art shall fall within the scope of the present disclosure.

Referring to FIG. 2 to FIG. 6A, the present disclosure discloses a stem for a bicycle, configured to mount a handle bar 100 of the bicycle to a mounting base 200 of a bicycle front fork. The stem includes: a first component 10, a second component 20, two first screws 31, two second screws 32, a first gasket 41 and a second gasket 42.

Figure 2:
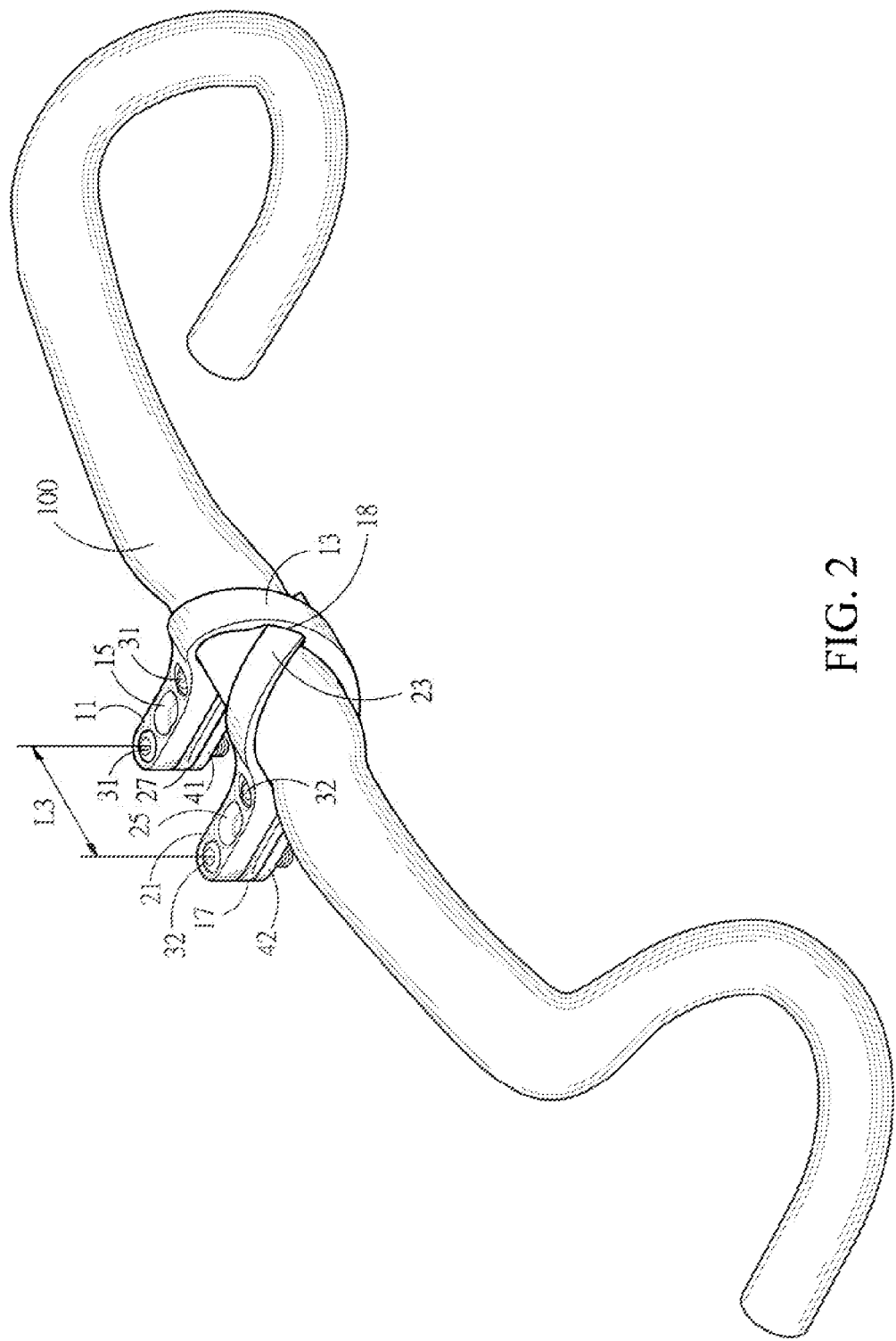
FIG. 2 is a schematic view showing that a stem is mounted to a handle bar of the bicycle according to the present disclosure.
Figure 3:
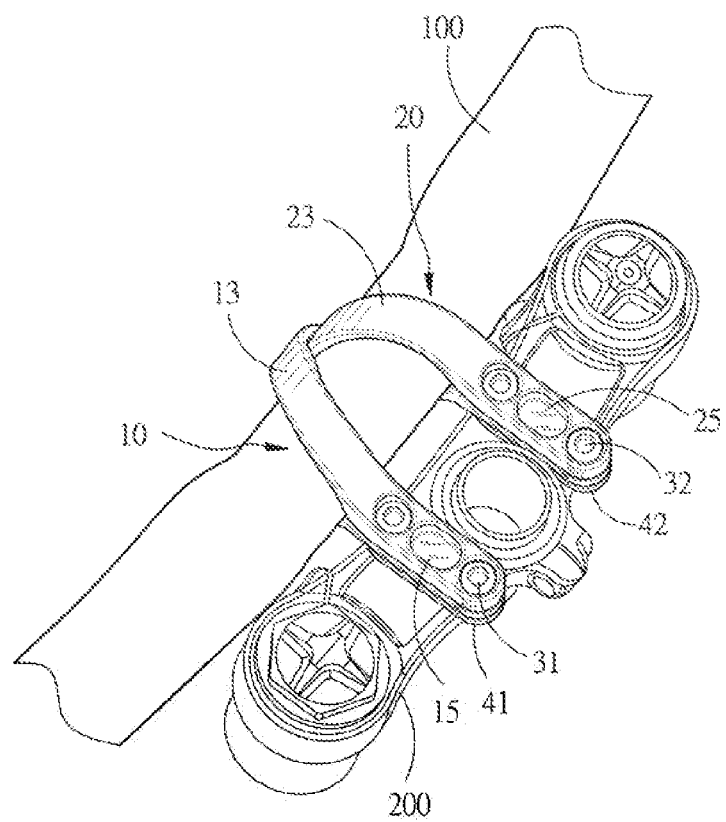
FIG. 3 is a part of an enlarged view from another direction showing that a stem is mounted to a handle bar of the bicycle according to the present disclosure.
Figure 7:
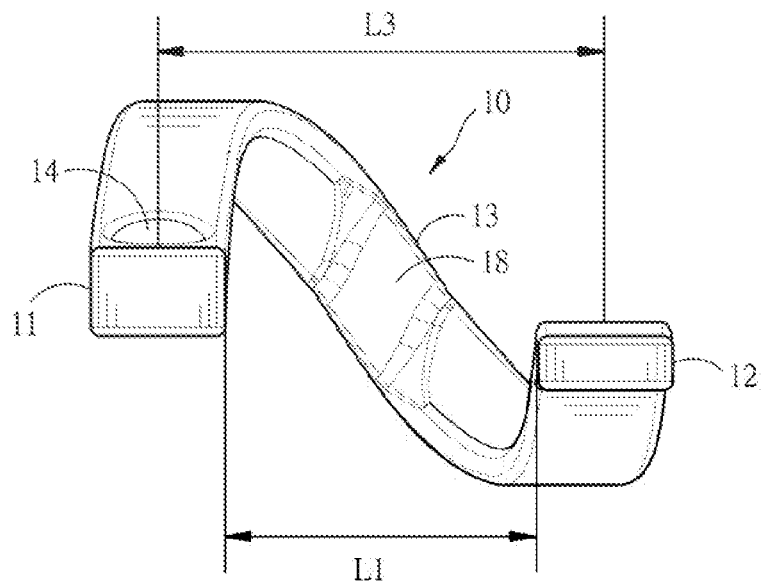
FIG. 7 is a planar view of a first component according to an embodiment of the present disclosure.

The first component 10 includes a first upper fixed seat 11 and a first lower fixed seat 12 opposite to the advancing direction of the bicycle, the first upper fixed seat 11 and the first lower fixed seat 12 are connected by a first connecting part 13, the first connecting part 13 is disposed along the outer surface of the handle bar 100 of the bicycle. The first upper fixed seat and the first lower fixed seat are horizontally offset by a first spacing. In other words, there is a distance L1 (i.e., the first spacing) of horizontal displacement between two adjacent side surfaces of the first upper fixed seat 11 and the first lower fixed seat 12, and the distance L1 is approximately 35 mm. However, a range of 25 mm to 45 mm is acceptable. As shown in FIG. 7, the first upper fixed seat 11 and the first lower fixed seat 12 are of different heights and are parallel to each other. In this embodiment, a bottom surface of the first upper fixed seat 11 and a top surface of the first lower fixed seat 12 are at the same level, and at least one first via hole 14 is formed on the first upper fixed seat 11. In this embodiment, two first via holes 14 are formed along a length direction of the first upper fixed seat 11, each for a first screw 31 to pass therethrough, a first cavity 15 is disposed between the two first via holes 14, so that the weight of the first component 10 can be reduced. The thickness of the first upper fixed seat 11 is greater than the thickness of the first lower fixed seat 12 and the thickness of the first connecting part 13, and at least one first through hole 16 is formed on the first lower fixed seat 12. In this embodiment, two first through holes 16 are formed along a length direction of the first lower fixed seat 12, a first flange 17 is disposed upward on an end part of the first lower fixed seat 12, and there is one first through hole 16 on the first flange 17; in addition, a recess 18 is disposed on an intermediate inner wall of the first connecting part 13, and there is a first protruding part 19 protruding toward the first upper fixed seat 11 between the first connecting part 13 and the first lower fixed seat 12. A horizontal distance L3 between the central axis of the first via hole 14 and that of the first through hole 16 is approximately 50 mm, as shown in FIG. 2, FIG. 4 and FIG. 7.

Figure 8:
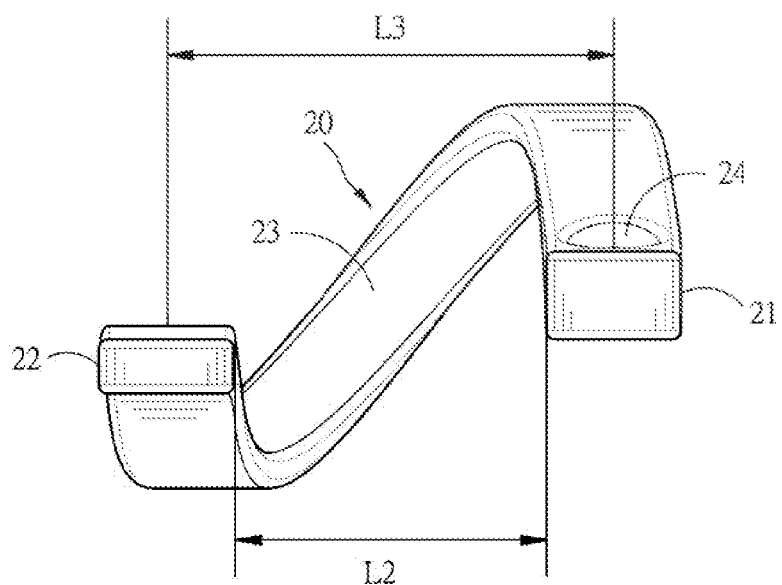
FIG. 8 is a planar view of a second component according to an embodiment of the present disclosure.

The second component 20 includes a second upper fixed seat 21 and a second lower fixed seat 22 opposite to the advancing direction of the bicycle, the second upper fixed seat 21 and the second lower fixed seat 22 are connected by a second connecting part 23, the second connecting part 23 is disposed along the outer surface of the handle bar 100 of the bicycle, and intersects with the first connecting part 13 through the recess 18 of the first connecting part 13. The second upper fixed seat and the second lower fixed seat are horizontally offset by a second spacing. In other words, there is a distance L2 (i.e., the second spacing) of horizontal displacement between two adjacent side surfaces of the second upper fixed seat 21 and the second lower fixed seat 22, and the distance L2 is approximately 35 mm. However, a range of 25 mm to 45 mm is acceptable and the distance L1 is roughly equal to the distance L2, referring to FIG. 8, the second upper fixed seat 21 and the second lower fixed seat 22 are of different heights. In this embodiment, a bottom surface of the second upper fixed seat 21 and a top surface of the second lower fixed seat 22 are at the same level as, and at least one second via hole 24 is formed on the second upper fixed seat 21. In this embodiment, two second via holes 24 are formed along a length direction of the second upper fixed seat 21, each for a second screw 32 to pass therethrough, a second cavity 25 is disposed between the two second via holes 24, so that the weight of the second component 20 can be reduced, the thickness of the second upper fixed seat 21 is greater than the thickness of the second lower fixed seat 22 and the thickness of the second connecting part 23, and at least one second through hole 26 is formed on the second lower fixed seat 22. In this embodiment, two second through holes 26 are formed along a length direction of the second lower fixed seat 22, a second flange 27 is disposed upward on an end part of the second lower fixed seat 22, and there is a second through hole 26 on the second flange 27; and there is a second protruding part 29 protruding toward the second upper fixed seat 22 between the second connecting part 23 and the second lower fixed seat 22. The first upper fixed seat 11 is vertically paired with the second lower fixed seat 22, and the second upper fixed seat 21 is vertically paired with the first lower fixed seat 12. A horizontal distance L3 between the central axis of the second via hole 24 and that of the second through hole 26 is approximately 50 mm, as shown FIG. 8.

Figure 4:
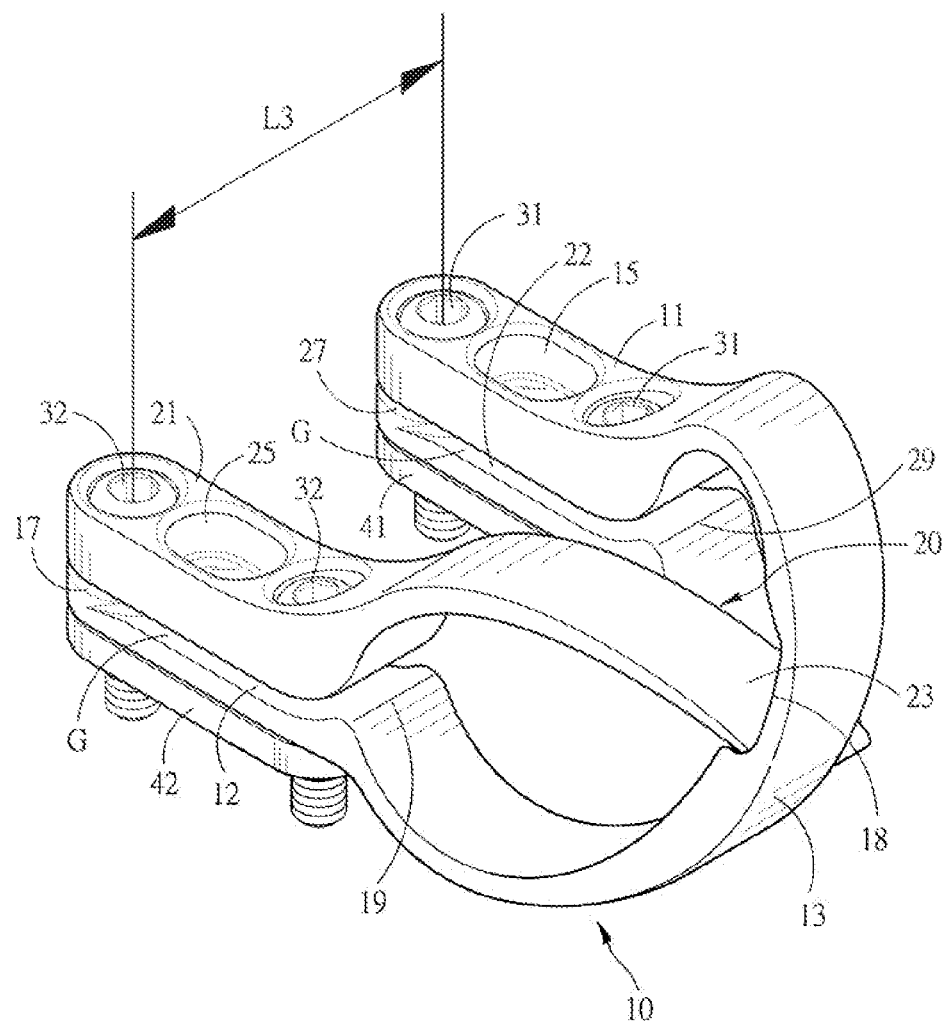
FIG. 4 is a combined three-dimensional view of a stem according to an embodiment of the present disclosure.
Figure 5:
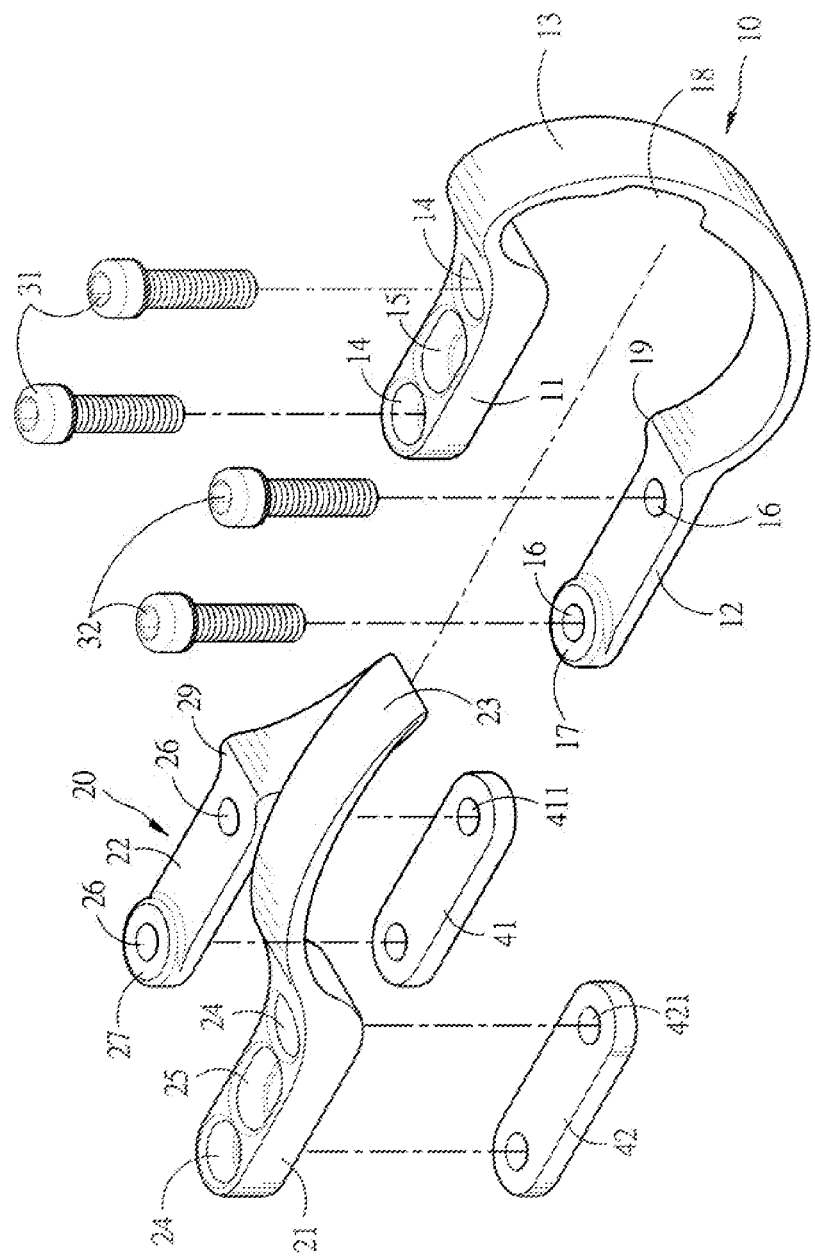
FIG. 5 is an exploded three-dimensional view of a stem according to an embodiment of the present disclosure.
Figure 6A:
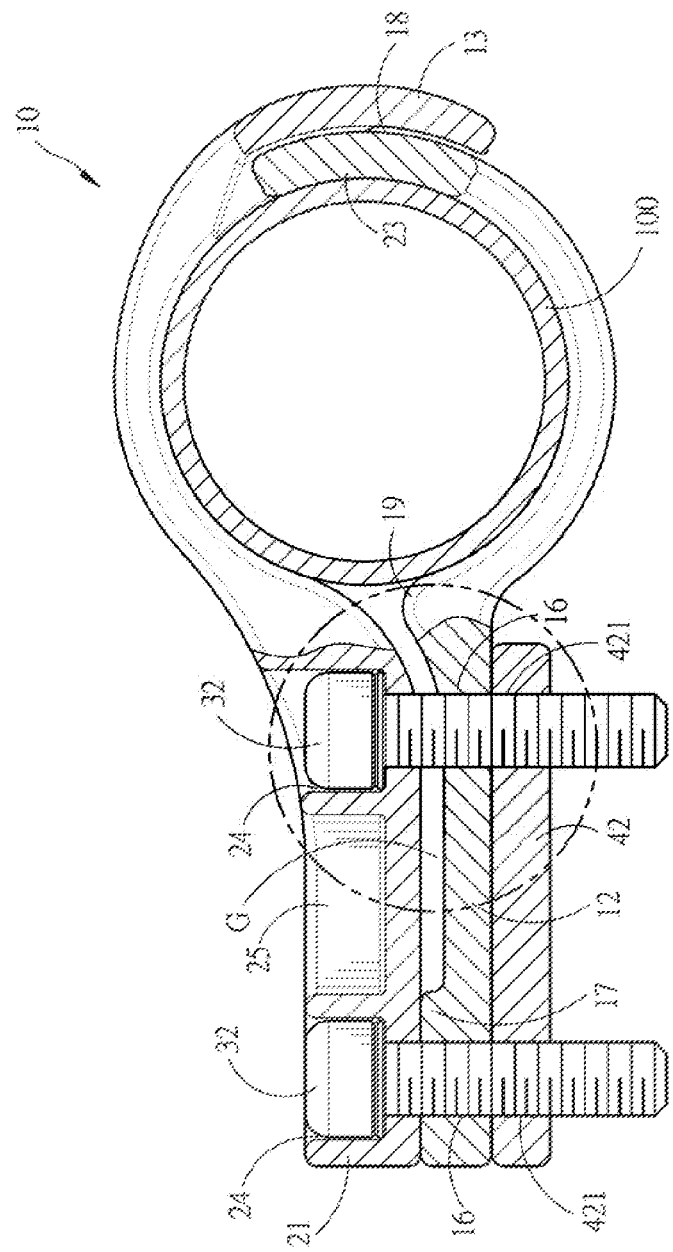
FIG. 6A is a part of a combined cross-sectional view of a stem according to an embodiment of the present disclosure.

Referring to FIG. 4, FIG. 6A and FIG. 6B, the second flange 27 is disposed between the first upper fixed seat 11 and the second lower fixed seat 22 and the first flange 17 is disposed between the second upper fixed seat 21 and the first lower fixed seat 12 respectively, so that a gap G is formed between the first upper fixed seat 11 and the second lower fixed seat 22 and a gap G is formed between the second upper fixed seat 21 and the first lower fixed seat 12 respectively, and the size of the gap G is adjusted by using the first screw 31 and the second screw 32, thereby providing a clamping force of the first component 10 and the second component 20 for the handle bar 100.

The first gasket 41 is disposed between one side of the mounting base 200 of the bicycle front fork and the second lower fixed seat 22 and has a shape matching a shape of the second lower fixed seat 22, and two first penetration holes 411 are disposed along a length direction of the first gasket 41. The two first penetration holes 411 correspond to the two second through holes 26 of the second lower fixed seat 22.

The second gasket 42 is disposed between another side of the mounting base 200 of the bicycle front fork and the first lower fixed seat 12 and has a shape matching a shape of the first lower fixed seat 12, and two second penetration holes 421 are disposed along a length direction of the second gasket 42. The two second penetration holes 421 correspond to the two first through holes 16 of the first lower fixed seat 12.

Through the foregoing structure, referring to FIG. 2 to FIG. 5, FIG. 6A and FIG. 6B for combination, the second connecting part 23 of the second component 20 surrounds the handle bar 100 of the bicycle, and the second upper fixed seat 21 and the second lower fixed seat 22 are positioned in a direction opposite to the advancing direction of the bicycle, and the first connecting part 13 of the first component 10 also surrounds the handle bar 100 of the bicycle to intersect with the second connecting part 23, and a middle section of the second connecting part 23 is inserted into a recess 18 of the first connecting part 13, the first connecting part 13 and the second connecting part 23 surround the handle bar 100 of the bicycle, and the first upper fixed seat 12 is superposed on the second lower fixed seat 22, the second upper fixed seat 21 is superposed on the first lower fixed seat 12, the second gasket 42 is disposed on a bottom of the first lower fixed seat 12, the first gasket 41 is disposed on a bottom of the second lower fixed seat 22. Then the two first screws 31 pass through the two first via holes 14 of the first upper fixed seat 11, the two second through holes 26 of the second lower fixed seat 22 and the two first penetration holes 411 of the first gasket 41 respectively, and the first screw 31 screws with a screw hole on one side of the mounting base 200 of the bicycle front fork. And, then the two second screws 32 pass through the two second via holes 24 of the second upper fixed seat 21, the two first through holes 16 of the first lower fixed seat 12 and the two second penetration holes 421 of the second gasket 42 respectively, and the second screw 32 screws with a screw hole on another side of the mounting base 200 of the bicycle front fork, so that the first connecting part 13 and the second connecting part 23 surround the handle bars 100 of the bicycle and are fixed on the mounting base 200 of the bicycle front fork. When the first screw 31 and the second screw 32 are rotated and locked into the mounting base 200 of the bicycle front fork, the first protruding part 19 of the first component 10 and the second protruding part 29 of the second component 20 can help the first connecting part 13 and the second connecting part 23 tightly bind the handle bar 100 of the bicycle, as shown in FIG. 4, FIG. 6A and FIG. 6B, and when the handle bar of the bicycle is mounted, a horizontal distance L3 between a central axis of the first screw 31 and a central axis of the adjacent second screw 32 is approximately 50 mm, as shown in FIG. 2 and FIG. 4.

Therefore, the present disclosure has at least the following advantages:

1. In the present disclosure, the first component 10 and the second component 20 include the first connecting part 13 and the second connecting part 23, the first connecting part 13 and the second connecting part 23 intersect with each other and are disposed along the outer surface of the handle bar 100 of the bicycle, and a horizontal displacement spacing between two adjacent side surfaces of the first upper fixed seat 11 and the first lower fixed seat 12 is 35 mm, a horizontal displacement spacing between two adjacent side surfaces of the second upper fixed seat 21 and the second lower fixed seat 22 is 35 mm, so that the handle bar 100 of the bicycle is clamped by the first connecting part 13 and the second connecting part 23 by a moderate width and has good controllability and stability.

2. In the present disclosure, the first component 10 and the second component 20 are bound the handle bar 100 of the bicycle, and the two first screws 31 and the two second screws 32 are used to screw and fasten to the mounting base 200 of the bicycle front fork, so that the structure is simple, and the weight is light, and manufacturing costs can be greatly reduced.

3. In the present disclosure, the two first screws pass through the two first via holes 14 of the first upper fixed seat 11, the two second through holes 26 of the second lower fixed seat 22 and the two first penetration holes 411 of the first gasket 41 respectively, the first screw then screws 31 with the screw hole on one side of the mounting base 200, the two second screws 32 pass through the two second via holes 24 of the second upper fixed seat 21, the two first through holes 16 of the first lower fixed seat 12 and the two second penetration hole 421 of the second gasket 42 respectively, and the second screw 32 then screws with the screw hole on the other side of the mounting base 200, whereby the handle bar 100 of the bicycle can be fixed on the mounting base 200 of the bicycle front fork through the present disclosure. Therefore, as compared with a conventional direct-mount stem structure, the present disclosure can save four screws, and the first component 10 and the second component 20 in a form of a ring belt according to the present disclosure have simple structure and light weight, so that not only the manufacturing costs can be reduced, but also the assembly is simple and quick, and the weight of the entire bicycle can be reduced.

In view of the above, prior to application, no identical or similar products were found to be on the market through investigation of bulletins and materials, thus having considerable novel, the bicycle handle bar have good controllability and stability compared with conventional technologies, and the present disclosure has advantages of a simple structure, light weight of the entire bicycle, and easily and quickly assembly, whereby a patent application is applied to a bureau according to provisions of the special law.

The above descriptions are merely preferred embodiments of the present disclosure, and are not intended to limit the scope of the embodiments of the present disclosure, any simple equivalent replacement and modification according to the scope of the patent application of the present disclosure and descriptions of the disclosure shall fall within the protection scope of the present disclosure.

What is claimed is:

1. A stem for a bicycle, configured to mount a handle bar of the bicycle to a mounting base of a bicycle front fork, comprising:
    a first component, comprising a first upper fixed seat and a first lower fixed seat, wherein the first upper fixed seat and the first lower fixed seat are connected by a first connecting part, at least one first via hole is formed on the first upper fixed seat, at least one first through hole is formed on the first lower fixed seat, and the first upper fixed seat and the first lower fixed seat are horizontally offset by a first spacing;
    a second component, comprising a second upper fixed seat and a second lower fixed seat, wherein the second upper fixed seat and the second lower fixed seat are connected by a second connecting part, at least one second via hole is formed on the second upper fixed seat, at least one second through hole is formed on the second lower fixed seat, and the second upper fixed seat and the second lower fixed seat are horizontally offset by a second spacing;
    a first screw, passing through the first via hole of the first upper fixed seat and the second through hole of the second lower fixed seat and screwed with a screw hole on one side of the mounting base of the bicycle front fork; and
    a second screw, passing through the second via hole of the second upper fixed seat and the first through hole of the first lower fixed seat and screwed with a screw hole on another side of the mounting base of the bicycle front fork.

2. The stem for a bicycle according to claim 1, wherein the first connecting part is disposed along an outer surface of the handle bar of the bicycle, the second connecting part is disposed along the outer surface of the handle bar of the bicycle and intersects with the first connecting part, the first connecting part of the first component is provided with a recess, and the second connecting part of the second component passes through the recess.

3. The stem for a bicycle according to claim 1, further comprising a first gasket and a second gasket, the first gasket is disposed between the mounting base of the bicycle front fork and the second lower fixed seat, and the second gasket is disposed between the mounting base of the bicycle front fork and the first lower fixed seat.

4. The stem for a bicycle according to claim 1, wherein a first protruding part protruding towards the first upper fixed seat is disposed between the first connecting part and the first lower fixed seat, and a second protruding part protruding towards the second upper fixed seat is disposed between the second connecting part and the second lower fixed seat.

5. The stem for a bicycle according to claim 1, wherein two first via holes are formed on the first upper fixed seat, two first through holes are formed on the first lower fixed seat, two second through holes are formed on the second upper fixed seat, and two second through holes are formed on the second lower fixed seat.

6. The stem for a bicycle according to claim 5, wherein a first cavity is formed between the two first via holes of the first upper fixed seat, and a second cavity is formed between the two second via holes of the second upper fixed seat.

7. The stem for a bicycle according to claim 1, wherein the first spacing is in a range of 25 mm to 45 mm; the second spacing is in a range of 25 mm to 45 mm, and the first spacing is equal to the second spacing.

8. The stem for a bicycle according to claim 7, wherein the first spacing is 35 mm; the second spacing is 35 mm, and the first spacing is equal to the second spacing.

9. The stem for a bicycle according to claim 7, wherein when the stem is mounted to the handle bar of the bicycle, a horizontal distance between a central axis of the first screw and a central axis of the adjacent second screw is 50 mm.

10. The stem for a bicycle according to claim 1, wherein a first flange towards the second upper fixed seat is disposed on the first lower fixed seat, one of the two first through holes is located in the first flange; and, a second flange towards the first upper fixed seat is disposed on the second lower fixed seat, and one of the two second through holes is located in the second flange.

11. The stem for a bicycle according to claim 10, wherein the first flange and the second flange are disposed on the first through hole and the second through hole far away from an end of the handle bar of the bicycle to form a gap between the first upper fixed seat and the second lower fixed seat and a gap between the second upper fixed seat and the first lower fixed seat.

* * * * *